United States Patent [19]
Wood et al.

[11] Patent Number: 5,004,549
[45] Date of Patent: Apr. 2, 1991

[54] METHOD FOR INHIBITING SCALE FORMATION USING CALCIUM HYPOCHLORITE COMPOSITIONS

[75] Inventors: Richard B. Wood, Bristol; Richard M. Mullins, Madison; John A. Wojtowicz, Cheshire, all of Conn.

[73] Assignee: Olin Corporation, Cheshire, Conn.

[21] Appl. No.: 419,237

[22] Filed: Oct. 10, 1989

[51] Int. Cl.$^5$ ............................................. C02F 1/76
[52] U.S. Cl. .................................. 210/699; 210/756; 210/764
[58] Field of Search .................... 210/699–701, 210/756, 764; 252/181, 180

[56] References Cited

U.S. PATENT DOCUMENTS

| | | | |
|---|---|---|---|
| 3,886,205 | 5/1975 | Geffers et al. | 210/699 |
| 4,087,360 | 5/1978 | Faust et al. | 210/756 |
| 4,780,216 | 10/1988 | Wojtowicz | 210/756 |
| 4,935,065 | 6/1990 | Bull | 252/174.16 |

FOREIGN PATENT DOCUMENTS 2141984  3/1973  Fed. Rep. of Germany .

OTHER PUBLICATIONS

Kirk–Othmer Encyclopedia of Chemical Technology, 3rd Edition, vol. 21, pp. 82–89, (NY–John Wiley 1983).

*Primary Examiner*—Peter Hruskoci
*Attorney, Agent, or Firm*—James B. Haglind; Paul Weinstein

[57] ABSTRACT

A solid calcium hypochlorite composition contains hydrated calcium hypochlorite and an alkali metal salt of phosphonobutane polycarboxylic acid having an available chlorine concentration of at least 50 percent by weight and a water content of at least 4 percent by weight.

It has been found that the use of the novel compositions of the present invention can significantly reduce scale formation in dispensers for calcium hypochlorite particularly where water having high total alkalinity is used. The prevention or inhibition of scale formation is accomplished without harmfully affecting other properties of the pool water such as the pH.

5 Claims, No Drawings

METHOD FOR INHIBITING SCALE FORMATION USING CALCIUM HYPOCHLORITE COMPOSITIONS

This invention relates to calcium hypochlorite compositions. More particularly, this invention relates to improved calcium hypochlorite compositions for disinfecting and sanitizing water supplies.

Calcium hypochlorite is widely used as a disinfectant and sanitizing agent for supplying available chlorine in the treatment of water supplies such as swimming pool water. To sanitize swimming pool water, available chlorine concentrations ranging from less than 1 part per million to a few parts per million are continually maintained. In conventional methods of application, granular calcium hypochlorite is periodically added directly to the water in the pool in quantities sufficient to maintain the available chlorine at the desired levels. It is preferred, however, to provide continuous contact between the pool water and the solid calcium hypochlorite. Placing tablets of calcium hypochlorite in the skimmer or in dissolving baskets around the pool is one method employed. Another method used is to add solid calcium hypochlorite to a dispensing device in which the calcium hypochlorite is contacted with the water to be treated so that the dissolving of the solid is controlled to form a solution of the desired available chlorine concentration. This concentrated solution is then added to the total body of pool water to provide the desired available chlorine concentration.

The operation of these dispensers in treating pool water is substantially trouble-free where the total alkalinity of the water is less than about 100 ppm (expressed as calcium carbonate).

Where the water has a total alkalinity in excess of about 100 ppm (as CaCO$_3$) and particularly where the pH is high, for example, in excess of 7.8, there is a tendency for the formation and build-up of scale when using dispensers for calcium hypochlorite. Scale build-up is deleterious in that it can block or plug up drains and outlets in the dispenser so that solution flow is deterred or stopped. This results in inconsistent control of the available chlorine concentration in the water body. Removal of this scale requires, for example, disassembly of the dispensing device and manual cleaning with strong mineral acid. This process is both time consuming and potentially hazardous.

Additives may be introduced to limit the formation of scale, for example, additives which reduce the PH can be added to the pool water or to the dispenser. The use of chemical additives of the scale inhibitor or dispersant tYpes have been shown to control scale in numerous industrial applications. Direct addition of these additives to the pool water, while possible, is not preferred, for example, as a much higher level of additive is required and maintenance of the proper additive level by direct addition to the dispenser is much more difficult to achieve.

Ideally it is desired to have a calcium hypochlorite composition which includes the additive to prevent or inhibit scale formation. In practice, however, it is difficult to find additives which can be directly admixed with calcium hypochlorite. Calcium hypochlorite is a highly active inorganic oxidizing agent which can react readily with oxidizable substances, such as organic substances, in an oxidation-reduction reaction. The addition of chemical compounds, particularly organic compounds, to solid calcium hypochlorite is therefore generally not practiced as the high reactivity of the resultant mixture can result in the release of toxic gases, fire or explosion.

H. Geffers et al in German Patent 2,141,984, issued Aug. 12, 1976 teaches that the use of phosphonopolycarboxylic acids or their salts in active chlorine containing solutions provides good water-softening action. Phosphonosuccinic acid or its sodium salt was added to alkaline chlorine bleach solutions in amounts of at least 5% by weight. Geffers et al also prepared a mixture of 90% of the Na salt of 2-phosphonobutane-1,2,4-tricarboxylic acid and 10% sodium dichloroisocyanurate which was added to water used in bottle washing machines.

The high degree of reactivity of solid calcium hypochlorite, however, is not encountered in aqueous solutions of hypochlorite compounds because of the much lower available chlorine concentrations and the moderating effect of water.

Further, mixtures containing high concentrations of phosphonopolycarboxylic acids or their salts are unsuitable for use in sanitizing and disinfecting water supplies as large amounts of the compositions are required which result in significant cost increases for water treatment.

Surprisingly it has now been found that calcium hypochlorite can be directly admixed with an alkali metal salt of a phosphonobutane polycarboxylic acid to produce dry solid stable compositions having high available chlorine concentrations for sanitizing and disinfecting water bodies while preventing the formation of scale in apparatus used in water treatment.

One component of the novel compositions of the present invention is calcium hypochlorite. Calcium hypochlorite compounds suitable for use include those having an available chlorine concentration of at least 50% by weight and are "hydrated", having a water content of at least 4 percent by weight. Preferably the calcium hypochlorite compounds have an available chlorine concentration of at least 65% and a water content in the range of from about 6 to about 18 percent, and more preferably the available chlorine concentration is at least 70% by weight and the water content is from about 6 to about 12 percent by weight.

Admixed with the calcium hypochlorite compound is an alkali metal salt of a phosphonobutane polycarboxylic acid represented by the formula:

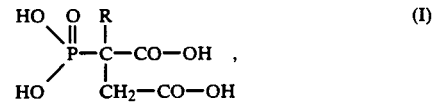

in which R represents H or CHR'—CHR"—CO—OH,

R' represents H or CO—OH, and

R" represents H or a lower alkyl group.

The alkali metal salts of these phosphonobutane polycarboxylic acids which can be employed include sodium, potassium, lithium, and mixtures thereof, among others. Preferred as alkali metals for reasons of availability and economy are sodium and potassium, with sodium being particularly preferred.

The phosphonobutane polycarboxylic acids represented by formula (I) include phosphonobutane dicarboxylic acid, phosphonobutane tricarboxylic acid, and phosphonobutane tetracarboxylic acid which may be substituted by lower alkyl groups (R") having up to about 4 carbon atoms such as methyl, ethyl, propyl, and butyl. Of these polycarboxylic acid compounds, preferred are those in which R represents CHR'—CHR"—CO—OH and R' represents H or CO—OH, and more preferred is phosphonobutane tricarboxylic acid in which R' represents H and R" represents H.

The calcium hypochlorite compositions of the present invention include amounts of the alkali metal salt of the phosphonobutane polycarboxYlic acid which are sufficient to inhibit or prevent scale formation, for example, on apparatus used in the sanitation of swimming pool water while providing high concentrations of available chlorine for sanitation. The compositions employ concentrations of the alkali metal salt of the phosphonobutane polycarboxylic acid of at least 0.005 percent by weight, for example, those in the range of from about 0.005 to about 5 percent by weight.

Preferred concentrations for both operative and economic reasons are those in the range of from about 0.01 to about 3, and more preferably from about 0.1 to about 1.5 percent by weight.

The calcium hypochlorite compositions are prepared by admixing the calcium hypochlorite with the alkali metal salt of the phosphonobutane polycarboxylic acid in any suitable manner.

In one embodiment calcium hypochlorite is admixed with the alkali metal salt of the phosphonobutane polycarboxylic acid to produce a dry blended product suitable for addition to water bodies such as swimming pools to sanitize the pool water. Any suitable means of mixing or blending the components of the compositions may be used including, for example, rotary drums or cylinders, inclined discs or pans, ribbon or paddle type blenders, centrifuges, planetary mixers, spiral elevators, fluid bed mixers, and the like.

Further, the novel compositions of the present invention may be agglomerated, for example by spray drying or spray graining or by other known methods such as those described in the Kirk-Othmer Encyclopedia of Chemical Technology, 3rd edition, volume 21, pages 82–89 (New York, John Wiley, 1983).

Preferred embodiments are compressed forms of the novel calcium hypochlorite compositions which can be used in a dispensing device which controls the dissolution of the composition, for example, by limiting in some manner contact of the water with the calcium hypochlorite composition. Suitable compressed forms include tablets, briquets, sticks or cylinders, pellets and the like.

These compressed forms are produced by known methods such as tabletting or briquetting. Of these compressed forms of the novel compositions of the present invention tablets or briquets are favored.

In an alternate embodiment, compressed forms of calcium hypochlorite may be contacted with the alkali metal salt of the phosphonobutane polycarboxylic acid to form a coating on the surface of the calcium hypochlorite.

Compressed forms of the novel calcium hypochlorite compositions can be used in any dispensing device which controls the dissolution of the solid composition. Typical examples include those of U.S. Pat. Nos. 2,700,651; 2,738,323; 3,416,897; 3,598,536; 3,607,103; 3,615,244; 3,638,833; 3,727,632; 3,802,845; 3,860,394; 3,864,090; 3,870,471; 3,912,627; 4,208,376; 4,374,563; 4,546,503; 4,643,881; D288,226; and D297,857 among others.

It has been found that the use of the novel compositions of the present invention can significantly reduce scale formation in dispensers for calcium hypochlorite particularly where water having high total alkalinity is used. The prevention or inhibition of scale formation is accomplished without harmfully affecting other properties of the pool water such as the pH, and thus does not promote the corrosion of metals such as Fe, Cu or Al used in components of the pool or the recirculation system. During storage neither component of the product undergoes significant decomposition which would result in the substantial loss of available chlorine or the breakdown of the phosphonobutane polycarboxylic acid.

The use of the novel composition of the present invention is compatible in aqueous solutions containing other additives to swimming pool water, for example, algaecides, stabilizing agents such as cyanuric acid, pH adjustment agents, for example sodium bisulfate and sodium carbonate, and bromine compounds such as bromochlorodimethyl hydantoin. In addition, there is no harmful build-up of the phosphonobutane polycarboxylic acid compound in the pool water.

The following examples are presented to further illustrate the invention without any intention of being limited thereby. All parts and percentages are by weight unless otherwise specified.

EXAMPLE 1

Commercial grade hydrated calcium hypochlorite (19.8 g.) containing 65% of available chlorine and 6% of water, was mixed with 0.2 grams of the sodium salt of 2-phosphonobutane 1,2,4-tricarboxylic acid (Na PBTC) and the granular mixture placed in a vial. The vial was sealed and stored in an oven at 45° C. for 30 days. At the end of this period, the sample was separated into components by sieving and the appropriate component analyzed. Available chlorine loss was determined by iodometric titration and PBTC loss by high pressure ion chromatography (HPIC) with a conductivity detector. The results are given in Table I below:

Comparative Example A

The procedure of Example 1 was repeated exactly using the sodium salt of hydroxyethylidene diphosphonic acid (HEDP), a commercially available scale inhibitor, as the additive. The results are given in Table I below.

TABLE I

| Example | Additive | Available Chlorine Loss Relative to Control | Additive Loss % |
|---|---|---|---|
| Control | None | 1.00 | NA |
| 1 | Na 2-phosphonobutane 1,2,4-tricarboxylate | 0.98 | 5.92 |
| Comp. A. | Na Hydroxyethylidene Diphosphonate | 0.96 | 82.27 |

As shown in Table I, little decomposition of the additive resulted in the composition of the invention using the sodium salt of 2-phosphonobutane 1,2,4-tricarboxylic acid. In contrast, decomposition of the sodium salt of hydroxyethylidene diphosphonic acid took place to the extent that this material would be unsuitable as an additive.

EXAMPLE 2

The hydrated calcium hypochlorite product of Example 1 (99 lbs, 45 kgs) was blended with 1 lb (0.45 kg) of the sodium salt of 2-phosphonobutane 1,2,4-tricarboxylic acid to produce a homogeneous mixture. The mixture was then tabletted on a Stokes press to form 7 gram tablets having a diameter of 0.75 inch (1.9 centimeters). The tablets were loaded into a dispenser of the type taught in U.S. Ser. No. 07/238,446, filed Aug. 31, 1988 by C. M. Zetena and R. P. Alexander. The dispenser included three chambers: a chemical chamber, a dissolving chamber, and a discharge chamber. The chemical chamber extended down into the dissolving chamber which overlay and was in flow communication with the discharge chamber. The chemical chamber contained a perforated grid onto which the tablets were placed The level of water which flowed into the dissolving chamber and which contacted the tablets on the perforated grid was controlled by a vertically adjustable level controller which also controlled the release of treated water from the dissolving chamber into the discharge chamber. Swimming pool water having a pH in the range of 7.8–8.2 and at a temperature of 85±2° F. (30±° C.) was continuously introduced into the dissolving chamber.

The swimming pool water had a total alkalinity of 120–160 ppm $CaCO_3$ and a calcium hardness of 300–500 ppm as $CaCO_3$. The vertical adjustable control means included a siphon tube for discharging treated water from the dissolving chamber to the discharge chamber. The vertical adjustable control means was set to provide a dissolving rate for the tablets of 10 lbs/day (4.5 kg/day). After all of the tablets had been dissolved, the siphon tube was removed and placed in 800 mls of dilute hydrochloric acid (1:10) to dissolve any scale present. De-ionized water was added to the hydrochloric acid solution to provide 1 liter of solution. The solution was analyzed for calcium by Atomic Absorption. The results are given in Table II below.

TABLE II

| Example No. | Wt % of $Ca(OCl)_2$ | Wt % of Na PBTC | Scale (g. $CaCO_3$) | % Scale Reduction |
|---|---|---|---|---|
| Control | 100 | — | 11.0 | NA |
| 2 | 99 | 1 | 0.37 | 97 |

EXAMPLE 3–4

The procedure of Example 2 was repeated with 50 lbs (23 kgs) of tablets containing 0.7% and 0.3 percent of Na PBTC respectively. The dissolving rate of the tablets was set at 12 lbs (5.5 kgs) per day. The results are given in Table III.

TABLE III

| Example No. | Wt % of $Ca(OCl)_2$ | Wt % of Na PBTC | Scale (g. $CaCO_3$) | % Scale Reduction |
|---|---|---|---|---|
| Control | 100 | — | 4.6 | NA |
| 3 | 99.3 | 0.7 | 0.68 | 85 |
| 4 | 99.7 | 0.3 | 1.5 | 67 |

EXAMPLE 5

The procedure of Example 2 was repeated using 100 lbs of tablets containing 0.1% by weight of Na PBTC. The tablets were dissolved at a rate of 15 lb. (6.8 kg) per day. The results are given in Table IV below.

TABLE IV

| Example No. | Wt % of $Ca(OCl)_2$ | Wt % of Na PBTC | Scale (g. $CaCO_3$) | % Scale Reduction |
|---|---|---|---|---|
| Control | 100 | — | 6.8 | NA |
| 5 | 99.9 | 0.1 | 6.4 | 5.3 |

EXAMPLE 6

Tablets containing 99.25% hydrated calcium hypochlorite and 0.75% NaPBTC were produced. The tablets were used in a dispenser of the type employed in Example 2. The dispenser was used to supply available chlorine to water in a 72,000 gallon swimming pool. The dispenser was operated for three weeks and in that time period almost no scaling was observed, no "downtime" was experienced, and no cleaning was required at the end of the three week period.

Comparative Example B

The procedure of Example 6 was employed using tablets of calcium hypochlorite without the scale inhibiting additive in the dispenser. During operation, severe scaling of various parts of the dispenser resulted, requiring disassembly and cleaning of the dispenser on a weekly basis.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A method for inhibiting scale formation in a dispensing means for adding calcium hypochlorite to water to form an aqueous solution of calcium hypochlorite which comprises:

adding to the dispensing means a solid calcium hypochlorite composition comprising hydrated calcium hypochlorite and an alkali metal salt of phosphonobutane polycarboxylic acid having a concentration of at least about 0.005 percent by weight an available chlorine concentration of at least 50 percent by weight and a water content of at least 4 percent bY weight, and contacting the solid calcium hypochlorite composition with water to form the aqueous solution of calcium hypochlorite.

2. The method of claim 1 in which the phosphonobutane polycarboxylic acid is represented by the formula:

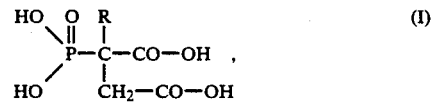

in which R represents H or CHR'—CHR"—CO—OH,
R' represents H or CO—OH, and
R" represents H or a lower alkyl group.

3. The method of claim 2 in which the alkali metal is sodium, potassium, and mixtures thereof.

4. The method of claim 3 in which the concentration of alkali metal salt of phosphonobutane polycarboxylic acid is in the range of from about 0.1 to about 1.5 percent by weight.

5. The method of claim 4 in which the compressed form is a tablet or briquet.

* * * * *